United States Patent Office 2,921,528
Patented Jan. 19, 1960

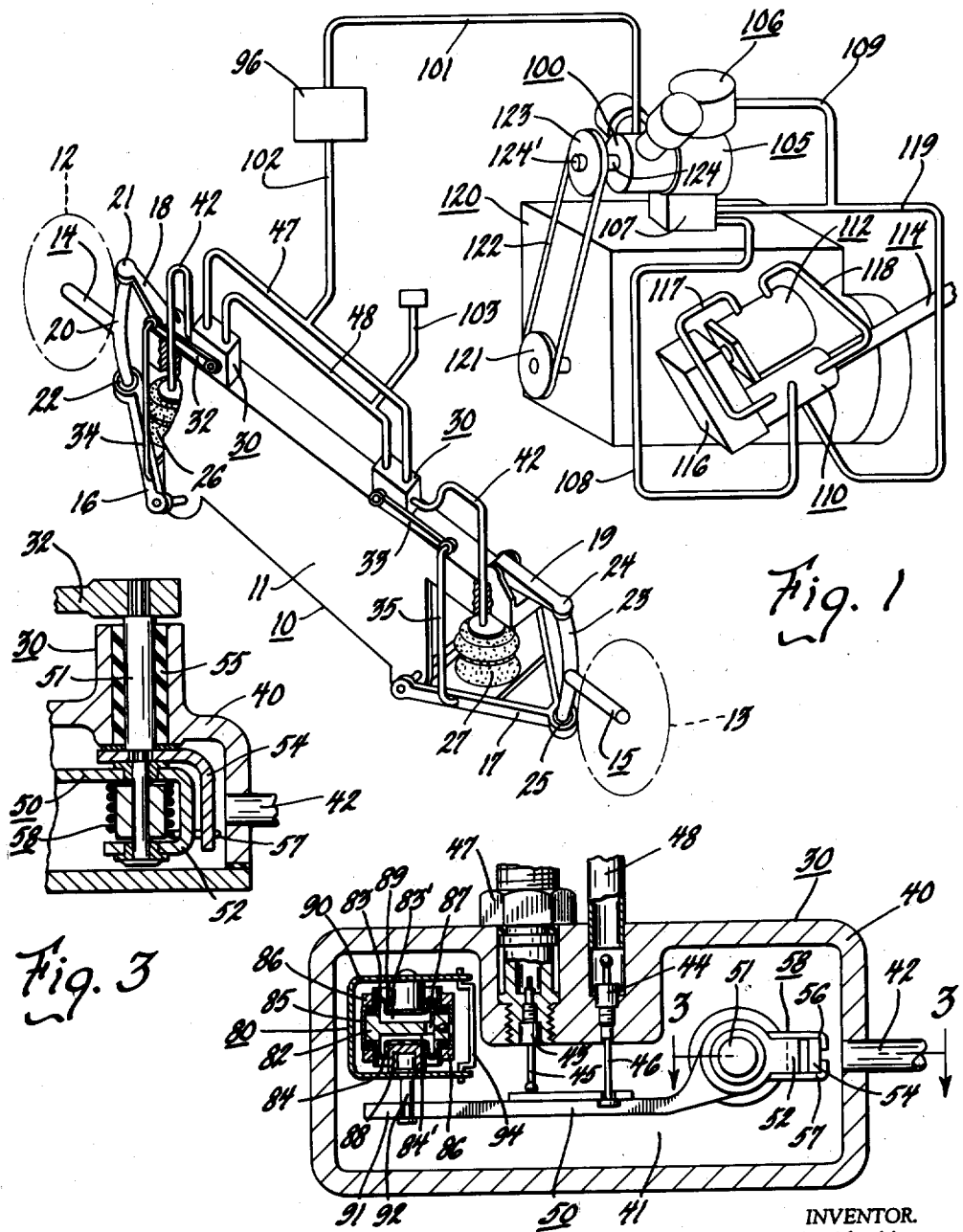

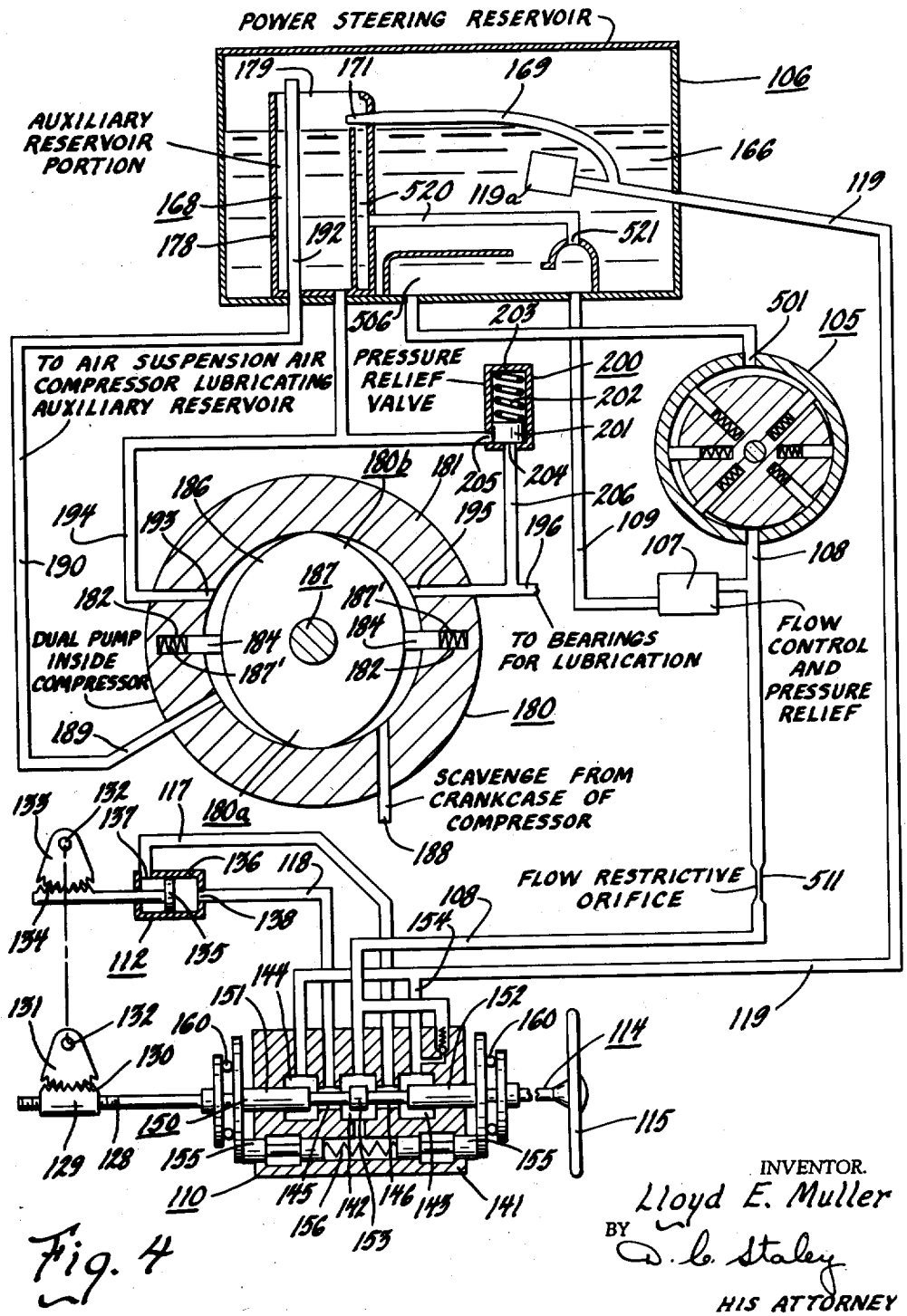

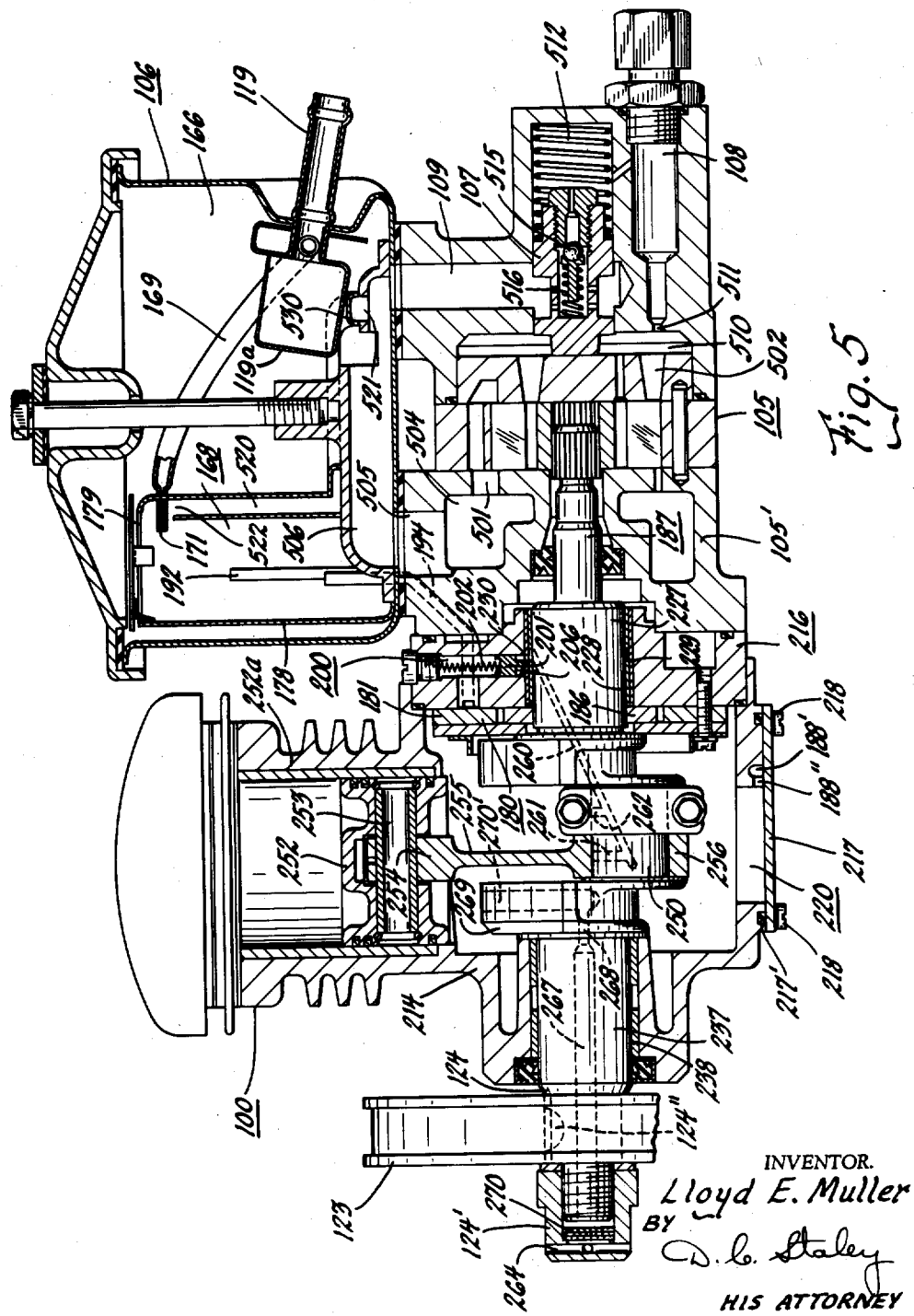

2,921,528

AIR COMPRESSOR LUBRICATION AND POWER STEERING SYSTEM

Lloyd E. Muller, Flint, Mich., assignor to General Motors Corporation, Detroit, Mich., a corporation of Delaware Application October 15, 1958, Serial No. 767,415

5 Claims. (Cl. 103—6)

This invention relates to motor vehicles, and, particularly to vehicles equipped with both power steering means and a pneumatic suspension means operable to maintain a predetermined clearance height between sprung and unsprung masses of a vehicle.

An object of this invention is to provide a pump and reservoir assembly for a combined vehicle power steering means and air compressor lubrication system including an air compressor with a crankshaft journaled at one end in a bearing member forming one side of a dual pump having a portion for scavenging a compressor crankcase and another portion for supplying fluid medium under pressure for lubrication of the compressor from a source which is a power steering reservoir adapted with a restrictive by-pass return passage to permit return of fluid medium by a power steering pump to a main portion of the reservoir as well as to an auxiliary portion of the reservoir through the restrictive passage, the auxiliary portion of the reservoir serving exclusively as a source of lubrication for the compressor, and to provide a second source of fluid supply to the auxiliary portion of the reservoir directly from the discharge side of the power steering pump.

Further objects and advantages will be apparent from the drawings, reference being had to the accompanying drawings wherein a preferred form of the invention is clearly shown.

In the drawings:

Figure 1 is a diagrammatic representation of power steering means and a part of a pneumatic suspension means combined in a system in accordance with the present invention.

Figure 2 is a cross-sectional elevational view of a height control valve provided between the sprung and the unsprung masses of a vehicle having the system of Figure 1.

Figure 3 is a partial cross-sectional view taken along line 3—3 of Figure 2.

Figure 4 is a schematic diagram of the combined system for vehicle power steering and compressor lubrication of the present invention.

Figure 5 is a longitudinal cross-sectional view showing an air compressor operably connected with a power steering pump and a power steering reservoir having main and auxiliary reservoir structures for use in accordance with the present invention.

In Figure 1 there is illustrated schematically a vehicle incorporating a system and apparatus for establishing and maintaining a predetermined clearance height between a sprung mass, or body, and an unsprung mass, or axle, of a motor vehicle. The vehicle includes a chassis frame on which a conventional body is placed. A front cross frame member 11 is shown and it is to be understood that longitudinal frame members (not shown) are provided in conventional manner extending to a rear frame portion relative to which a rear axle is carried in conventional manner. Wheels 12 and 13 are journaled for rotation relative to front wheel axle assemblies 14 and 15 respectively provided at each end of the front cross member 11.

Each front wheel axle assembly consists of lower control arms 16 and 17 and upper control arms 18 and 19 respectively, pivotally carried on the cross frame 11. The control arms 16 and 18 are interconnected by a steering knuckle 20 connected with the control arms by spherical joints 21 and 22. Similarly, the control arms 17 and 19 are interconnected by a steering knuckle 23 that connects with the control arms by spherical joints 24 and 25. Fluid or air springs 26 and 27 are provided between the lower control arms 16 and 17 and opposite ends of the cross frame 11 whereby the chassis frame 10 is the sprung mass supported from the wheel assemblies, the unsprung mass, 14 and 15 by means of the fluid or air springs 26 and 27. Preferably, the fluid springs 26 and 27 are of the bellows type adapted to receive air under pressure to effect resilient suspension of the chassis frame 10 upon the wheel assemblies, and to maintain a predetermined clearance height between the chassis frame and the wheel assemblies when the vehicle is in a static position, and to provide for correction of any change in height relation to re-establish the predetermined clearance height by control of the air pressure within the springs 26 and 27.

Fluid pressure within the springs 26 and 27 is regulated by fluid control valves, or height control valves, generally indicated by numeral 30 that are supported on the chassis frame 10. The control valves 30 have actuating arms 32 and 33 respectively that are connected with the lower control arms 16 and 17 of the front wheel assemblies through actuating links 34 and 35. Thus when the chassis frame 10 settles downwardly relative to the front wheel assemblies upon an increase of load in the vehicle, the actuating levers 32 and 33 are moved upwardly to open a fluid or air control valve within the valves 30 to allow fluid under pressure to be admitted into the air spring 26 and 27. Conversely, upward movement of the chassis frame 10 relative to the front wheel assemblies, upon a decrease of load in the vehicle, causes a downward movement of the control arms 32 and 33 to open fluid exhaust valves within the controls 30 to permit exhaust of fluid from the air springs. The foregoing action of the control valves 30 effects a correction of clearance height between the sprung mass and the unsprung mass of the vehicle to maintain clearance height relatively constant irrespective of load conditions. One of the control valves 30 is more particularly illustrated in Figures 2 and 3.

The control valve comprises a housing 40 having a chamber 41 from which a fluid supply conduit 42 extends into connection with one of the air springs 26 or 27 from the respective control valve. The housing 40 contains a fluid pressure inlet control valve 43 and a fluid pressure outlet control valve 44 each of which is similar to a conventional tire valve. The valve 43 is opened upon upward movement of an actuating stem 45 and the valve 44 is opened upon downward movement of the actuating stem 46. The fluid pressure inlet connection 47 carries the valve 43 and the valve 44 exhausts fluid into the conduit connection 48 and thereby to atmosphere through line 103. The valve stems 45 and 46 are actuated by a lever or arm 50 that is supported on a shaft 51 for free rotation thereon. The arm 50 has a portion 52 engaged on opposite sides by opposite ends 56 and 57 of a torsion spring 58. Torsion springs 58 is visible in cross sectional view Figure 3. In addition to engaging opposite sides of portion 52, the opposite ends 56 and 57 of the torsion spring also engage an actuating member 54 that is attached to the shaft 51 that extends exteriorly of the housing 40 through a rubber bearing and seal member 55 as shown in Figure 3. The outer end of the shaft 51 carries the actuating arm 32 or 33 of the control valve 30.

When the actuating lever 32 moves upwardly causing clockwise rotation of shaft 51 as viewed in Figure 2, the arm 50 opens the valve 43 to allow fluid pressure to enter the chamber 41 to be delivered through a conduit 42 into the air spring connected with the valve.

When the lever 32 moves downwardly causing counterclockwise rotation of shaft 51 as viewed in Figure 2, the arm 50 opens the valve 43 to allow fluid pressure to enter the chamber 4 to be delivered through a conduit 42 into the air spring connected with the valve.

When the lever 32 moves downwardly causing counterclockwise rotation of shaft 51 as viewed in Figure 2, the valve 44 is opened to allow exhaust of fluid from the air spring. The shaft 51 can oscillate relative to the actuating arm 50 and torsion spring ends 56 and 57 absorb excessive pendulum action without effecting comparable following movement of the arm 50 since the arm 50 is damped in its pivotal movement about shaft 51 by a dashpot or damping device generally indicated by numeral 80.

The damping device 80 comprises a partition member 82 having diaphragms 83 and 84 secured to opposite sides thereof by annular clamping sleeve means 85 which are fixedly supported relative to the housing 40 by means of laterally extending arms 86. The diaphragms 83 and 84 together with the partition member 82 form opposite cavities 83' and 84' communicating with each other through a restrictive passage 87 in the partition member 82 as shown in Figure 2. These cavities are preferably filled with a damping fluid having a relatively constant viscosity over a wide range of temperature variation. The damping action results when annular abutment members 88 and 89 carried by a C-shaped spring member 90 are moved in one direction or the other by the action of the end 91 of arm 50 transmitted through the C-shaped spring 90 by a connecting stud 92. Use of the spring means 90 assures that the members 88 and 89 are always resiliently urged against the diaphragms 83 and 84 to eliminate the formation of air pockets in the cavities or chambers 83' and 84'. The resilient urging of the spring means 90 assures engagement of the diaphragms 83 and 84 with the damping fluid in the chambers 83' and 84' even when the damping fluid contracts in response to a decrease in temperature, for example. To prevent complete collapse of the members 88 and 89 relative to the damping chambers, a spacing bracket 94 is provided assuring a predetermined minimum spacing between the free ends of the spring means 90 as shown in Figure 2.

The control valves 30, one of which has just been described in detail with Figures 2 and 3, obtain fluid under pressure from an air reservoir generally indicated by numeral 96 on Figure 1. Fluid under pressure, preferably air, is supplied to the air reservoir 96 by means of a compressor generally indicated by numeral 100 having a conventional air intake and delivering air under pressure through a conduit 101 to the air reservoir or high-pressure storage tank 96 for delivery to the control valves 30 through a conduit 102 to the connection 47 with the control valves 30. Control valves 30 have their exhaust conduits 48 connected with an exhaust line 103 as shown in Figure 1. The air suspension means described functions such that the damping device 80 of each control valve 30 retards the opening and closing of the inlet and exhaust valves 43 and 44 so that rapid axle oscillations will not be followed to the same extent by arm 50 and cause instantaneous delivery and exhaust of fluid to and from the air springs. Air is supplied or exhausted from the respective air springs 26 and 27 only in response to an average change in the predetermined clearance height to one other than the predetermined clearance height between the sprung and unsprung masses resulting from either an increase or decrease of loading of the body of the vehicle which is then compensated to re-establish the predetermined clearance height by increase or exhaust of air under pressure in the air springs 26 and 27.

As indicated in Figure 1, the motor vehicle is also provided with hydraulically actuated power steering means. The power steering means includes a power steering pump generally indicated by numeral 105 that receives fluid from a fluid reservoir 106 and delivers fluid under pressure into discharge conduit means 108 that includes flow control and by-pass valve means 107. The flow control and by-pass valve 107 is adapted to maintain a predetermined liquid flow volume and a maximum pump pressure in the discharge line 108 for continuous supply of power steering fluid to the hydraulically actuated power steering component 110 to insure supply of fluid to the component at all times when the vehicle is operating. This flow control and by-pass valve 107 is also connected to the reservoir 106 by passage means 109 so that fluid in excess of the predetermined maximum pressure will be by-passed to the reservoir 106. The controlled volume flow and pressure line 108 connects directly with a power steering control valve 110 that regulates the flow of hydraulic fluid medium to a fluid actuated motor generally indicated by numeral 112.

Figure 1 also shows schematically a steering column generally indicated by numeral 114 as well as gearing means 116 actuated both by the rotation of the steering wheel connected in a conventional manner with the steering column 114 and by the fluid actuated motor 112 as is more fully explained with reference to Figure 4.

Conduits 117 and 118 connect opposite ends of the control valve 110 with opposite ends of the fluid motor 112. A return conduit 119 from the control valve 110 leads to the power steering reservoir 106.

Also shown in Figure 1 is a motor generally indicated by numeral 120 of the vehicle having a conventional crankshaft (not shown) which drives a pulley 121 and belt 122 that engages a pulley 123 attached to a crankshaft extension 124 of the air compressor 100. Thus, the vehicle engine 120 by means of a suitable belt and pulley drive causes rotation of a compressor crankshaft through pulley 123 effecting compression of air supplied through conduit 101 to the high-pressure air storage tank 96 referred to with Figure 1. An extension of the compressor crankshaft serves to effect operation of the power steering pump 105 due to the coaxial relationship of the power steering pump 105 relative to the compressor 100 adjacent one side of the twin cylinder compressor illustrated in Figure 1. It is apparent that the power steering reservoir 106 is mounted on top of the power steering pump 105 as shown in Figure 1. It is one of the purposes of this invention to use the reservoir for the power steering means as a source for lubricating oil for the air compressor 100.

With reference to Figure 4, the steering unit comprises the steering column 114 having the usual steering wheel 115. The steering column 114 includes a screw 128 that carries a nut 129 having a rack 130 engaging a rack segment 131 carried on a shaft 132 that is connected with a pitman shaft for actuating the front wheels of a motor vehicle. The shaft 132 connected with the pitman shaft is also connected with a gear segment 133 that engages a rack 134 actuated by the hydraulic component 112. The rack 134 is connected with a piston 135 reciprocable within a cylinder 136 adapted to be supplied with fluid through either of the ports 137 or 138 through the lines 117 or 118, respectively, or exhaust fluid through these lines alternately so that reciprocation of piston 135 in the cylinder 136 can transmit driving power to the rack segment 133 thereby power actuating the rack segment 131 and the pitman shaft for steering the front wheels.

The control valve 110 for regulating supply of fluid medium under pressure or exhausting power steering fluid medium from the hydraulically actuated component 112 comprises a body 141 having there chambers 142, 143, and 144 interconnected by passages 145 and 146. The pressure supply line 108 from the power steering pump source 105 connects with the chamber 142 and the two end chambers 143 and 144 connect with the return line 119 that connects with the power steering reservoir 106. The two supply lines 117 and 118 for the hydraulically actuated component 112 connect with the passages 145 and 146 as shown.

A spool valve 150 having two end portions 151 and 152 and a middle portion 153 is adapted for axial reciprocation in the body 141 to direct flow of fluid between the passages 117 and 118 or to allow the fluid to circulate through the return lines 154 and 119 to the reservoir 106. The body 141 of the control valve 110 is provided with self-centering plungers 155 and a spring 156 which normally position the spool 150 in the position illustrated in Figure 4. Normally, when steering actuation is not required, fluid medium under pressure circulates from the pump source through the line 108 into the chamber 142 and then through the passages 145 and 146 into the return lines 154 and 119 to the reservoir 106. When steering actuation is to be obtained, and the steering wheel is turned in one direction or another, the reaction of the screw 128 and the nut 129 is such as to cause one or the other of the thrust bearings 160 to move the spool 150 axially in one direction or the other, depending upon the direction of the rotation of the steering wheel 115 whereby the center spool member 150 is moved to close either passage 145 or 146. For example, if the reaction is such as to cause the spool 150 to move in a right-hand direction, the passage 146 will be closed whereby fluid under pressure entering chamber 142 is directed through the line 118 to the right-hand end of the power unit 112, exhaust of fluid being effected from the left-hand end of the power unit through the line 117 into the passage 146 and into the chamber 143 for return to the reservoir 106 through the return lines 154 and 119. Reverse actuation of the steering wheels will cause reverse actuation of the spool 150 to effect discharge of fluid medium under pressure through the lines 118 back to the reservoir 106.

The twin cylinder air compressor illustrated in Figure 5 has a piston 252 reciprocable in each cylinder 252a in a usual manner to compress air for storage in the high-pressure air storage tank 96. Each of the pistons in the air compressor is fitted through a pin 253 to a conventional connecting rod 254 which is attached to an eccentric portion 250 of a crankshaft of the compressor in a manner familiar to those skilled in the art. The crankshaft of the compressor is rotatably supported in a crankcase housing 214 of the compressor by crankshaft journaling portions providing bearing supports 238 and 229 for opposite ends of the crankshaft. Provided inside the compressor crankcase housing is a dual pump 180 which is operatively driven by rotation of the compressor crankshaft. This dual pump is illustrated diagrammatically in Figure 4 and is generally indicated by the numeral 180. The dual pump includes a stator portion 181 having recesses 182 of proper size and depth to receive vanes 184 biased into engagement with an eccentric pump rotor 186 by springs 187' provided in the recesses 182. The vanes and eccentric or egg-shaped rotor are maintained in pumping cooperation relative to the oil pump stator during the rotation of the rotor 186 by compressor crankshaft 187 which the rotor 186 is suitably attached. The periphery of the pump rotor 186 cooperates with each vane 184 for reciprocable movement of the vanes relative to the recess in the pump stator in a conventional manner.

The dual pump 180 includes a scavenging pump portion generally indicated by numeral 180a and a lubricating pump pressure portion generally indicated by numeral 180b on diametrically opposite sides of the pump. An inlet 188 is provided for the scavenging pump portion 180a for removal of lubricating oil from the compressor crankcase. The scavenging pump portion 180a forces the oil removed from the compressor crankcase to passage means 189 connected to the scavenge pump outlet 190 forcing the fluid medium upwardly to an auxiliary reservoir portion 168 by way of a standpipe 192. As described earlier, the auxiliary reservoir portion 168 is located in the power steering fluid main reservoir 106 as shown in Figure 5 and diagrammatically in Figure 4.

The pressure pump portion 180b of the dual pump 180 includes an inlet 193 connected to passage means 194 communicating with the bottom of the auxiliary reservoir portion 168 for supply of power steering fluid medium to the pump portion 180b to be utilized in lubrication of the compressor 100. The inlet 193 channels lubricating fluid to the pressure pump portion 180b of the dual pump 180 which forces fluid under pressure outwardly through an outlet 195 into a conduit passage 196 connecting with passages leading to the bearings of the compressor being lubricated with the power steering fluid medium. Lubricating fluid medium is forced under pressure to bearing surfaces between connecting rods and eccentric crankshaft portions as well as to crankshaft journaling portions provided inside the compressor 100.

To assure that lubricating pressure does not exceed a predetermined maximum value, a blow-off or blow-by means generally indicated by numeral 200 is provided in the system of the present invention. This blow-off includes a valve spool 201 biased by a spring 202 in a housing 203 to a position shown in Figure 4 whereby the spool closes off communication between ports 204 and 205 of the housing so long as the fluid pressure does not exceed the force of spring 202. A passage 206 is connected between the pressure lubrication line 196 and port 204 thereby exposing the spool 201 to the discharge pressure from the pressure lubrication portion 180b of the dual pump 180. When fluid pressure exceeds a predetermined value at the compressor bearing, the power steering fluid medium is permitted to blow-off into the inlet passage means 194 of the compressor portion 180b.

The purpose for return of the blow-by fluid medium to the inlet passage 194 and inlet 193 of the pressure lubrication portion of the dual pump rather than to the reservoir directly lie in the functioning of the dual pump 180. Both pump portions 180a and 180b have an equal displacement as far as lubricating oil under pressure and scavenging are concerned due to the symmetrical structure of the rotor 186. The capacity of the scavenging portion 180a of the dual pump 180 is such that a so-called "dry" crankcase is maintained in the compressor 100 leaving only a minimum amount of oil in the compressor during operation.

The crankshaft extension 187 drives the power steering fluid pump 105, the pump and reservoir 106 being mounted directly on the compressor crankcase 214. The pump 105 is a vane-type pump having inlet passage means 501 and outlet passage means 502. The inlet passage means 501 connects with a chamber 504 that, in turn, connects with the main reservoir 106 through a passage 505 connecting with a chamber 506 in the bottom of the reservoir 106.

The pump 105 discharges into a chamber 510 that is connected with the discharge passage 108 through means of a restrictive passage 511 which permits a predetermined volume flow of oil to be discharged into passage 108 for circulation through the power steering valve 110 continuously. When the pump 105 discharges liquid at a rate above the predetermined volume flow the by-pass valve 107 is urged against the spring 512 to permit excess oil to pass into the passage 109 for return to the reservoir 106. During operation of the power steering system, if pressure in passage 108 rises above a predetermined maximum value, then pressure release valve 515 will be urged against spring 516 to allow pressure fluid to return to passage 109 and thence to reservoir 106.

In accordance with the present invention, the power steering reservoir 106 is provided with an auxiliary reservoir portion generally indicated by numeral 168 in addition to the main reservoir portion 166. The fluid medium return line 119 has an end portion 119a extending into the power steering reservoir 106 for return of power steering fluid medium to the main reservoir portion 166 in the usual manner. However, an additional line 169 is connected to the return line 119 at one end and to by-pass a part of the return fluid to the secondary or auxiliary reservoir 168 as shown in Figures 4 and 5. This by-pass return means preferably includes a restrictive passage 171 to insure primary return of fluid to the main reservoir 166. Thus, power steering fluid medium, in a limited quantity, is by-passed from the return line 119 through line 169 over the top of the auxiliary reservoir portion 168 in the power steering reservoir 106. Fluid delivered into the auxiliary reservoir 168 will fill the auxiliary reservoir with power steering fluid medium to be used as a source of lubrication for bearings in the compressor 100 illustrated in Figure 1. The auxiliary reservoir portion 168 is adapted to contain a quantity of power steering fluid medium adequate for lubrication of the bearings in the air compressor through use of the pressure lubrication pump 180b disposed inside the air compressor and driven by the air compressor crankshaft. The auxiliary reservoir portion 168 includes a cylindrical container 178 having an open top 179 as shown in Figures 4 and 5. The container 178 may be formed integral with the power steering reservoir 106, if desired. In any event, power steering fluid medium filled into the auxiliary reservoir portion 168 can overflow into the main reservoir portion 166 whenever the container 178 is filled.

To insure a positive flow of oil into the secondary or auxiliary reservoir, a second source of oil supply is provided by way of the passage 520 that has its inlet at 521 in the chamber 506 and its outlet 522 within the secondary reservoir 168. This passage receives oil returning to the main reservoir under pressure from the by-pass passage 109 for delivery into the secondary reservoir. Since the pump 105 is constantly delivering oil in volume greater than used in the steering system there will always be oil flowing through passage 109, that enters the chamber 506 beneath the dome 530 at which the inlet 521 is provided for passage 520. Oil will thus pass into line 520 under some pressure sufficient to flow upward into the secondary reservoir.

The advantage of having the auxiliary reservoir 168 with the power steering reservoir 106 lies in a safety feature whereby fluid medium is available for lubrication of the compressor in the present combined system even when a complete loss of fluid occurs in the power steering means using the main reservoir portion 166. Yet it is possible to utilize the power steering fluid for lubrication of the compressor without necessitating the additional cost of providing both a power steering reservoir as well as a main reservoir including the auxiliary reservoir. It is apparent that the auxiliary reservoir contains appreciably less fluid than the main reservoir portion of the power steering reservoir.

Since the auxiliary reservoir contains less fluid than the main reservoir portion, a further advantage is realized in that only the smaller amount of fluid contained in the auxiliary reservoir portion can ever be drained through the pressure lubrication pump portion into the compressor in the event that the vehicle equipped with the system of the present invention stands idle for a long period of time. Since only the smaller quantity of fluid can drain down during long periods of idleness, no flooding of the compressor crankcase can occur in the compressor 100. Any fluid which drained down to the crankcase of the compressor is pumped through the scavenging pump portion 180a of the dual pump 180 to the auxiliary reservoir portion 168 as described above and continues to circulate for lubricating purposes of the compressor even if the power steering system should lose all power steering fluid therein. The by-pass return 109 and 520 assures that the auxiliary reservoir portion 168 is filled to its proper level during operation of the power steering pump. This guarantees continued supply of lubricating oil or power steering fluid medium for the lubrication of the compressor.

The passages and conduits described with the system of Figure 4 interconnecting the three pumps with the power steering reservoir 106 having main and auxiliary portions serve to channel a fluid medium from a wet reservoir common to the power steering means and air suspension air compressor lubrication means. Since a substantially dry crankcase is maintained by the scavenging pump portion 180a of the dual pump, the compressor crankshaft can be provided with a ventilating passage terminating in a cap 124' shown at the end 124 of the compressor crankshaft in the view of Figure 5. This cap 124' is apertured to permit breathing or interchange of air to inside the compressor crankcase to compensate for the removal of power steering fluid medium used for lubrication and scavenged from the bottom of the compressor crankcase by the system described above.

The specific structural arrangement of the compressor 100 with the power steering pump 105 and the reservoir 106 of Figure 1 is shown in detail in Figure 5. Each of the cylinders is provided with an air intake passage not visible in the drawings but conventional with air compressors. The compressor housing 214 supports a crankshaft journaling end member generally indicated by numeral 216. This end member 216 is maintained in sealed relationship with the power steering pump housing 105' to complete the conduit 194 referred to in the description in Figure 4 and shown as a dotted line in Figure 5. Figure 5 further shows an opening 188' and 188" corresponding to the connection 188 of the scavenge pump portion 180a with the compressor crankcase. The crankcase housing 214 is provided with a bottom cover plate 217 maintained in sealing engagement with a gasket 217' by bolts 218 threaded into engagement with the housing 214 to hold the cover plate 217 in position in a usual manner. The cover plate 217 and housing 214 form a crankcase or sump space generally indicated by numeral 220 in the bottom of the air compressor 100. As described earlier, the scavenging pump portion 180' of the dual pump operates at a rate of fluid displacement sufficient to maintain a substantially "dry" crankcase in the air compressor. For purposes of scavenging the crankcase, a conduit extension 188' is visible in Figure 5, together with an inlet 188" leading to the inlet passage 188 for the scavenge pump portion 180a.

For lubrication of the crankshaft at other than journal portions 227 and 237 separate passages are provided extending into an eccentric portion 250 of the crankshaft 187. As mentioned earlier, each compressor cylinder is provided with piston means shown specifically in Figure 5 as a piston 252 attached by a pin 253 to one end 254 of a connecting rod 255 having a bearing portion 256 fitted around the eccentric portion 250 of the crankshaft in a usual manner. A similar piston and connecting rod attachment with the crankshaft is provided for each of the cylinders of compressor 100. Lubricating fluid medium supplied to the bearing portion 227 and annular space 230 formed by bushing 228 can also flow into a diagonally drilled passage 260 of the crankshaft as shown in the cross-sectional view of Figure 5 by dotted lines. A pair of passages 261 and 262 are provided in the eccentric portion 250 of the crankshaft extending radially outwardly thereof for supply of lubricating fluid medium to bearing surfaces between the eccentric portion 250 and each of the ends of the connecting rods journaled around the eccentric portion 250. A separate passage extension can be provided longitudinally within the connecting rods extending to the bearing surfaces of the connecting rod relative to each pin 253 or a splashing action can be relied upon for lubrication of each pin 253 if the scavenging pump portion of the dual pump in providing a substantially "dry" crankcase still leaves sufficient fluid inside the crankcase 220 resulting in splashing of the power steering fluid medium for lubrication of the pins during rotation of the crankshaft 187 by the pulley and belt arrangement described with Figure 1.

Figure 5 also shows the pulley 123 referred to in the diagram of Figure 1. This pulley 123 is secured to an end of the crankshaft 187 by a Woodruff key 124″ adjacent the ventilating end cap 124′ referred to with the description of Figure 1. As shown in Figure 5, the end cap is provided with radial passages 264 which communicate with an axial passage 267 drilled longitudinally through the crankshaft 187 from one side and extending to a restrictive orifice 268 formed adjacent an eccentric lobe 269 on the crankshaft. A filter 270 may be provided for preventing entry of dust and other foreign material through the radial passages 264 into the passage 267 of the crankshaft in addition to the restrictive passage formed by the orifice 268. For permitting breathing or entry of air relative to the crankcase 220 inside the compressor housing 214, the lobe 269 is provided with a passage 270′ extending radially of the axis of rotation of the crankshaft and communicating with the space inside the compressor housing 214 as well as with the orifice 268. The lobe 269 effects a splashing action relative to any fluid medium which may be in the crankcase 220 when the lobe 269 is positioned downwardly as viewed in Figure 5. During the time when the lobe 269 is positioned upwardly as shown in Figure 5, a breathing action can occur permitting air interchange through the passages 264, 267, orifice 268 and passage 270′ between the atmosphere outside the compressor and space inside the compressor housing 214.

While the embodiments of the present invention as herein disclosed constitute a preferred form, it is to be understood that other forms might be adopted.

What is claimed is as follows:

1. An air compressor lubrication and power steering system for use on a motor vehicle, comprising, an air compressor including a housing having a driving shaft journaled therein in bearing means drivingly connected with air compressing means in said housing, an hydraulic liquid power steering pump, an hydraulic liquid reservoir including a main reservoir section and a small auxiliary reservoir section, dual pump means in said compressor having one portion in fluid communication with said auxiliary reservoir receiving fluid from the same and in fluid communication with the compressor bearing means supplying said fluid under pressure thereto and a second portion in fluid communication with the interior of the compressor housing receiving fluid from the same and in fluid communication with said auxiliary reservoir delivering said fluid to the same, power steering control valve means, said power steering pump having fluid communication means connecting the pump with said main reservoir receiving fluid therefrom and having fluid communication connecting means with said control valve means delivering said fluid thereto, said control valve means having fluid communication means connecting the same with said main reservoir to return fluid thereto, said last-mentioned fluid communication means including fluid communication means connecting the same with said auxiliary reservoir for delivery of fluid thereto from the said last-mentioned fluid communication means, said fluid communication means connecting said power steering pump with said control valve means including by-pass means delivering fluid from the last-mentioned means to the main reservoir and including means delivering fluid to said auxiliary reservoir.

2. An air compressor lubrication and power steering system for use on a motor vehicle, comprising, an air compressor including a housing having a driving shaft journaled therein in bearing means drivingly connected with air compressing means in said housing, an hydraulic liquid power steering pump, an hydraulic liquid reservoir including a main reservoir section and a small auxiliary reservoir section, dual pump means in said compressor having one portion in fluid communication with said auxiliary reservoir receiving fluid from the same and in fluid communication with the compressor bearing means supplying said fluid under pressure thereto and a second portion in fluid communication with the interior of the compressor housing receiving fluid from the same and in fluid communication with said auxiliary reservoir delivering said fluid to the same, power steering control valve means said power steering pump having fluid communication means connecting the pump with said main reservoir reeciving fluid therefrom and having fluid communication connecting means with said control valve means delivering said fluid thereto, said control valve means having fluid communication means connecting the same with said main reservoir to return fluid thereto, said last-mentioned fluid communication means including fluid communication means connecting the same with said auxiliary reservoir for concurrent delivery of fluid thereto from the said last-mentioned fluid communication means and including flow resistance means therein proportioning fluid flow therefrom between said main reservoir and said auxiliary reservoir, said fluid communication means connecting said power steering pump with said control valve means including by-pass means delivering fluid from the last-mentioned means to the main reservoir and including means delivering fluid to said auxiliary reservoir.

3. An air compressor lubrication and power steering system for use on a motor vehicle, comprising, an air compressor including a housing having a driving shaft journaled therein in bearing means drivingly connected with air compressing means in said housing, an hydraulic liquid power steering pump, an hydraulic liquid reservoir including a main reservoir section and a small auxiliary reservoir section, dual pump means in said compressor having one portion in fluid communication with said auxiliary reservoir receiving fluid from the same and in fluid communication with the compressor bearing means supplying said fluid under pressure thereto and a second portion in fluid communication with the interior of the compressor housing receiving fluid from the same and in fluid communication with said auxiliary reservoir delivering said fluid to the same, power steering control valve means, said power steering pump having fluid communication means connecting the pump with said main reservoir receiving fluid therefrom and having fluid communication connecting means with said control valve means delivering said fluid thereto, said control valve means having fluid communication means connecting the same with said main reservoir to return fluid thereto, said last-mentioned fluid communication means including fluid communication means connecting the same with said auxiliary reservoir for concurrent delivery of fluid thereto from the said last-mentioned fluid communication means and including restriction means therein to insure primary flow of fluid to said main reservoir with secondary flow being to said auxiliary reservoir, said fluid communication means connecting said power steering pump with said control valve means including by-pass means delivering fluid from the last-mentioned means to the main reservoir and including means delivering fluid to said auxiliary reservoir.

4. An air compressor lubrication and power steering system for use on a motor vehicle, comprising, an air compressor including a housing having a driving shaft journaled therein in bearing means drivingly connected with air compressing means in said housing, an hydraulic liquid power steering pump, an hydraulic liquid reservoir including a main reservoir section and a small auxiliary reservoir section, dual pump means in said compressor having one portion in fluid communication with said auxiliary reservoir receiving fluid from the same and in fluid communication with the compressor bearing means supplying said fluid under pressure thereto and a second portion in fluid communication with the interior of the compressor housing receiving fluid from the same and in fluid communication with said auxiliary reservoir delivering said fluid to the same, power steering control valve means, said power steering pump having fluid communication means connecting the pump with said main reservoir receiving fluid therefrom and having fluid communication connecting means with said control valve means delivering said fluid thereto, said control valve means having fluid communication means connecting the same with said main reservoir to return fluid thereto, said last-mentioned fluid communication means including fluid communication means connecting the same with said auxiliary reservoir for concurrent delivery of fluid thereto from the said last-mentioned fluid communication means, said fluid communication means connecting said power steering pump with said control valve means including a pressure-actuated fluid by-pass control means providing for fluid flow from the power steering pump to the main reservoir through by-pass flow connecting means connecting said by-pass control means with said mean reservoir, said by-pass flow connecting means including fluid communication means connecting said by-pass flow connecting means with said auxiliary reservoir to provide a second source of fluid supply to said auxiliary reservoir.

5. An air compressor lubrication and power steering system for use on a motor vehicle, comprising, an air compressor including a housing having a driving shaft journaled therein in bearing means drivingly connected with air compressing means in said housing, an hydraulic liquid power steering pump, an hydraulic liquid reservoir including a main reservoir section and a small auxiliary reservoir section, dual pump means in said compressor having one portion in fluid communication with said auxiliary reservoir receiving fluid from the same and in fluid communication with the compressor bearing means supplying said fluid under pressure thereto and a second portion in fluid communication with the interior of the compressor housing receiving fluid from the same and in fluid communication with said auxiliary reservoir delivering said fluid to the same, power steering control valve means, said power steering pump having fluid communication means connecting the pump with said main reservoir receiving fluid therefrom and having fluid communication connecting means with said control valve means delivering said fluid thereto, said control valve means having fluid communication means connecting the same with said main reservoir to return fluid thereto, said last-mentioned fluid communication means including fluid communication means connecting the same with said auxiliary reservoir for concurrent delivery of fluid thereto from the said last-mentioned fluid communication means and providing thereby a first source of fluid for said auxiliary reservoir to maintain the same filled with fluid, said main reservoir having a chamber within said reservoir that is independent of said main chamber and said auxiliary chamber, fluid flow communication connecting means connecting said power steering pump with said chamber for delivery of fluid from the power steering pump into said chamber, said chamber having passage means therein providing for flow of fluid delivered thereto by said power steering pump into said main reservoir, and fluid flow communication connecting means connecting said chamber with said auxiliary reservoir to provide thereby a second source of fluid supply to the auxiliary reservoir.

No references cited.